L. TROXLER.
CUSHIONED STEERING AXLE.
APPLICATION FILED JAN. 9, 1918.

1,287,143.

Patented Dec. 10, 1918.

Inventor
Leon Troxler
By
Attorney

UNITED STATES PATENT OFFICE.

LEON TROXLER, OF NEW ORLEANS, LOUISIANA.

CUSHIONED STEERING-AXLE.

1,287,143. Specification of Letters Patent. Patented Dec. 10, 1918.

Application filed January 9, 1918. Serial No. 211,017.

*To all whom it may concern:*

Be it known that I, LEON TROXLER, a citizen of the United States, residing at New Orleans, in the county of Orleans and State of Louisiana, have invented certain new and useful Improvements in Cushioned Steering-Axles, of which the following is a specification.

The invention relates to a cushioned front steering axle.

The object of the present invention is to improve the construction of steering axles for automobiles, motor trucks, and various other vehicles and to provide a simple, practical and efficient front steering axle of strong, durable and comparatively inexpensive construction equipped with cushioning means adapted to absorb and dissipate shocks incident to the travel of the vehicle wheels over rough surfaces before the main springs of the vehicle are brought into action, whereby the device will have substantially the effect of converting a rough road into a smooth one and prevent the engine and other parts from rattling to pieces and at the same time save the tires. It is also an object of the invention to provide a cushioned front steering axle of this character adapted to make possible the running of trucks equipped with solid tires, at a good rate of speed.

With these and other objects in view the invention consists in the novel construction, combination and arrangement of parts hereinafter fully described, illustrated in the accompanying drawing and pointed out in the claims hereto appended, it being understood that various changes in the form, proportion, and minor details of construction, within the scope of the claims may be resorted to without departing from the spirit or sacrificing any of the advantages of the invention.

In the drawing.

Like numerals of reference designate corresponding parts in the several figures of the drawing.

Figure 1:
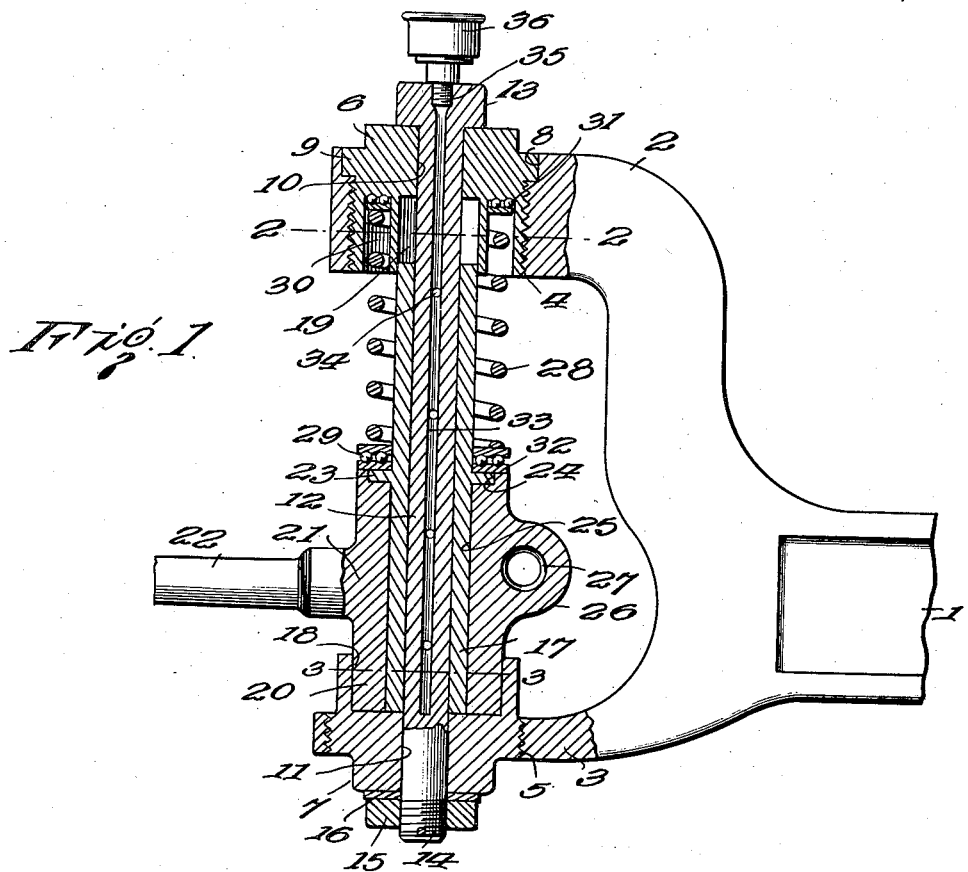
Figure 1 is a vertical sectional view of one side of a left hand side of a front steering axle constructed in accordance with this invention.
Figure 2:
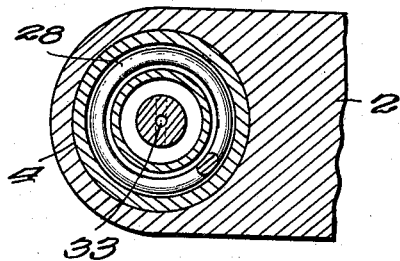
Fig. 2 is a horizontal sectional view on the line 2—2 of Fig. 1.
Figure 3:
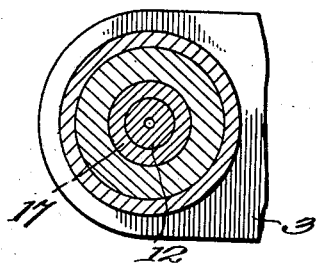
Fig. 3 is a similar view on the line 3—3 of Fig. 1.

In the accompanying drawing in which is illustrated the preferred embodiment of the invention, 1 designates the body portion of the front axle provided with upper and lower arms 2 and 3 having vertically alined threaded openings 4 and 5 for the reception of upper and lower heads 6 and 7 which are threaded into the said openings 4 and 5. The upper arm is preferably of greater thickness than the lower arm, but the parts may be made of any desired proportions to adapt the steering axle to the character of vehicle on which it is to be used, and the said arm is provided at the upper end of the opening 4 with a smooth counterbore or enlargement 8 of the said opening to receive an annular flange or portion 9 which forms a shoulder or stop for the upper head. The upper and lower heads are also provided with polygonal wrench receiving portions to enable them to be readily screwed into and out of the openings 4 and 5 of the arms 2 and 3.

The heads 6 and 7 are provided with centrally arranged vertically alined openings 10 and 11 through which passes a vertical bolt 12 provided at its upper end with a head 13 and threaded at its lower portion at 14 for the reception of a nut 15, a washer 16 of common steel or any other suitable material being interposed between the nut 15 and the lower face of the head 7. The bolt receives a bushing 17 of brass or other suitable material extending upwardly from the bottom of a recess or socket 18 in the lower head to a recess 19 in the upper head. The recess or socket 18 in the lower head is of greater diameter than the sleeve or bushing 17 to leave an annular groove or space surrounding the lower portion of the sleeve 17 for the reception of a lower cylindrical portion 20 of the body portion 21 of a spindle 22 which is adapted to turn on the bushing. The bushing is provided at an intermediate point with an exterior horizontally disposed annular flange 23 which fits within a recess 24 in the upper end of the body portion 21 of the spindle. The body portion of the spindle is provided with a central vertical opening 25 for the reception of the sleeve and it is enlarged at the inner portion at 26 and provided with a horizontally disposed tapered opening 27 adapted to receive a steering arm (not shown) for enabling the pivoted spindle to be connected with the steering mechanism of a motor vehicle.

The upper portion of the sleeve 17 fits tightly or snugly within the recess 19 which forms an annular air chamber or cylinder in which air is confined to cause the same to be compressed by the sleeve 17 and cushion the same to supplement the cushioning action of a coiled spring 28. The coiled spring 28 is disposed on the sleeve 17 and its lower end is supported upon a lower ball bearing 29 and its upper portion extends into an annular groove or recess 30 in the lower portion of the upper head. The annular groove or recess extends upwardly from the lower end of the upper head and an upper ball bearing 31 is interposed between the upper end of the coiled spring and the top end wall of the annular groove or recess 30. Annular groove or recess 30 surrounds the air chamber and the upper and lower ball bearings are preferably provided with two sets of anti-friction balls, but any other form of anti-friction device may of course be employed and a washer 32 of steel or other suitable material is arranged upon the body portion of the spindle 22 and the flange 23 to coact with the balls of the lower ball bearing 29. When the front axle is subjected to a weight sufficient to effect a compression of the coiled spring, the coiled spring will be compressed between the body portion of the spindle and the upper head and the ball bearings and the bushing or sleeve 17 will enable the vehicle to be easily steered so that the cushioning means will not materially affect such steering action of the vehicle.

The bolt 12 is provided with a vertical oil passage or opening 33 adapted to receive a suitable lubricant and communicating with a plurality of transverse passages 34 which communicate with the exterior surface of the bolt and the interior surface of the sleeve or bushing for lubricating the same. The upper portion 35 of the opening or oil passage 33 is enlarged or counterbored and threaded for the reception of a grease cup 36.

The pivoted spindle may be readily removed when required, by withdrawing the bolt and unscrewing the upper and lower heads so that access to any of the parts may be readily had. Also in the event of breakage or other injury to the coiled spring, steering of the vehicle will not be affected.

What is claimed is:

1. A front steering axle including a body portion having upper and lower arms, a pivot mounted in the said arms, the upper arm being provided with an air chamber surrounding the pivot, a spindle mounted on the pivot and a sleeve also arranged on the pivot and movable with the spindle and coöperating with the air chamber to pneumatically cushion the axle, and a coiled spring disposed on the sleeve and interposed between the spindle and the upper arm to form a cushion for the axle.

2. A front steering axle including a body portion having upper and lower arms, an upper head mounted in the upper arm and provided with an annular recess, a pivot carried by the arms and piercing the upper head, a spindle mounted on the pivot, a coiled spring interposed between the spindle and the upper head and having its upper end fitted in the said recess, an upper ball bearing located within the recess and interposed between the head and the upper end of the coiled spring and a lower ball bearing supporting the lower end of the spring.

3. A front steering axle including a body portion having upper and lower arms, an upper head having an inner annular recess and an outer annular groove surrounding the recess, the former forming an air chamber, a pivot carried by the arms and piercing the upper head, a sleeve arranged on the pivot and operating in the air chamber to form pneumatic cushioning means, a spindle mounted on the sleeve and a coiled spring disposed on the sleeve and interposed between the spindle and the upper head and having its upper portion arranged within the outer groove of the head.

4. A front steering axle including a body portion having upper and lower arms, upper and lower heads mounted in the arms and provided with annular recesses, the upper head being also provided with an inner annular groove forming an air chamber, a pivot piercing the heads, a sleeve mounted on the pivot and coöperating with the air chamber to form pneumatic cushioning means, a spindle having a body portion mounted on the sleeve and fitted in the recess of the lower head, and a coiled spring interposed between the spindle and the upper head and having its upper portion arranged in the recess of the latter.

5. A front steering axle including a body portion having upper and lower arms, a pivot carried by the arms, a sleeve slidable on the pivot and provided with an exterior flange, a spindle mounted on the sleeve and located beneath and engaging the said flange to cause an upwardly movement of the said sleeve when the spindle moves upwardly along the pivot, and a spring disposed on the upper portion of the sleeve above the flange for cushioning the sleeve.

In testimony whereof I affix my signature in the presence of two witnesses.

LEON TROXLER.

Witnesses:
HANS TRICPEL,
ANTAY COLOMB.